United States Patent
Daugs et al.

(10) Patent No.: US 10,808,074 B2
(45) Date of Patent: Oct. 20, 2020

(54) GLYCIDYL ETHER ALKOXYLATE BLOCK COPOLYMERS

(71) Applicants: Dow Global Technologies LLC, Midland, MI (US); Rohm and Haas Company, Collegeville, PA (US)

(72) Inventors: Edward D. Daugs, Midland, MI (US); John J. Rabasco, Allentown, PA (US); Antony K. Van Dyk, Blue Bell, PA (US); Tianlan Zhang, Garnet Valley, PA (US)

(73) Assignees: Rohm and Haas Company, Collegeville, PA (US); Dow Global Technologies LLC, Midland, MI (US)

( * ) Notice: Subject to any disclaimer, the term of this patent is extended or adjusted under 35 U.S.C. 154(b) by 158 days.

(21) Appl. No.: 16/005,798

(22) Filed: Jun. 12, 2018

(65) Prior Publication Data

US 2018/0355107 A1    Dec. 13, 2018

Related U.S. Application Data

(60) Provisional application No. 62/518,861, filed on Jun. 13, 2017.

(51) Int. Cl.
| | |
|---|---|
| *C08G 65/26* | (2006.01) |
| *C09D 7/65* | (2018.01) |
| *C09D 5/02* | (2006.01) |
| *C09D 7/63* | (2018.01) |
| *C09D 5/00* | (2006.01) |
| *C08G 65/22* | (2006.01) |
| *C09D 171/02* | (2006.01) |
| *C08F 16/12* | (2006.01) |
| *C08F 16/36* | (2006.01) |

(52) U.S. Cl.
CPC ......... *C08G 65/2612* (2013.01); *C08G 65/22* (2013.01); *C09D 5/00* (2013.01); *C09D 5/024* (2013.01); *C09D 7/63* (2018.01); *C09D 7/65* (2018.01); *C09D 171/02* (2013.01); *C08G 2650/58* (2013.01)

(58) Field of Classification Search
None
See application file for complete search history.

(56) References Cited

U.S. PATENT DOCUMENTS

| | | | |
|---|---|---|---|
| 5,292,828 A | 3/1994 | Jenkins et al. | |
| 8,859,684 B2 | 10/2014 | Chu et al. | |
| 2007/0249780 A1 | 10/2007 | Bakeev et al. | |
| 2010/0062666 A1* | 3/2010 | Siemensmeyer | D06M 13/17 442/59 |
| 2011/0144248 A1 | 6/2011 | Zong et al. | |
| 2011/0257326 A1* | 10/2011 | Jaunky | B01F 17/0028 524/539 |
| 2017/0240692 A1* | 8/2017 | Roland | C08G 59/68 |

FOREIGN PATENT DOCUMENTS

| | | | | |
|---|---|---|---|---|
| CA | 1162409 A | * | 2/1984 | ............ C08G 65/26 |
| DE | 2745872 B1 | * | 3/1979 | ........... C09B 67/008 |
| JP | 54082485 A | * | 6/1979 | |
| JP | 2003226887 A | * | 8/2003 | |
| JP | 2006028425 | | 2/2006 | |

* cited by examiner

*Primary Examiner* — Rachel Kahn
*Assistant Examiner* — Ha S Nguyen
(74) *Attorney, Agent, or Firm* — Reid S. Willis

(57) ABSTRACT

The present invention relates to a compound having the following structure I:

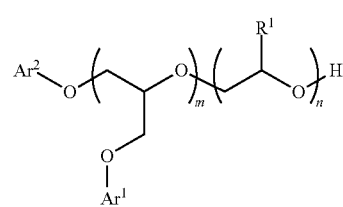

where $Ar^1$, $Ar^2$; $R^1$, m, and n are defined herein. The compound of the present invention is useful as an open time additive in waterborne coatings compositions, particularly waterborne paint compositions.

8 Claims, No Drawings

GLYCIDYL ETHER ALKOXYLATE BLOCK COPOLYMERS

BACKGROUND OF THE INVENTION

The present invention relates to glycidyl ether alkoxylate block copolymers, which are useful as open time additives in coatings formulations.

Government regulations and market movement continually drive toward zero volatile organic compounds (VOC) for coating formulations. Consequently, waterborne formulations that are free of volatile solvents and coalescents have become increasingly popular in the industry. Nevertheless, paint properties have been compromised due to this sea change; among them is open time, which is the period of time during which a freshly applied paint film can be reworked without leaving brush marks. In a solvent-borne system, open time is about 30 to 45 min; in a typical waterborne formulation, open time is on the order of 3 to 5 min.

U.S. Pat. No. 8,859,684 B2 discloses the preparation of phenyl glycidyl ether alkoxylates that are useful as open time additives in waterborne paint formulations. The best open times reported were 8 minutes using 2.5% by weight of the additive. However, the use of such high concentrations of a surfactant to achieve a marginal increase in open time is of limited commercial value due to the additive's contribution to the degradation of other properties of the final coating. Accordingly, there is an ongoing need in the art to find an additive for waterborne formulations that significantly increases open time over currently available additives without degrading other properties of the final coating, such as film adhesive and cohesive strength, hardness, block resistance, early blister resistance, scrub and wash resistance, stain resistance, and mar resistance.

SUMMARY OF THE INVENTION

The present invention addresses a need in the art by providing a compound having the following structure I:

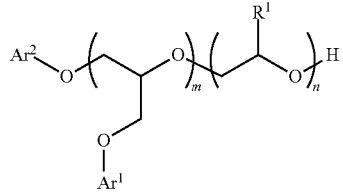

where $Ar^1$ is unsubstituted phenyl or naphthyl, or phenyl or naphthyl substituted with from 1 to 3 $C_1$-$C_6$ alkyl groups; and $Ar^2$ is phenyl, phenyl-$OCH_2CH_2$—, benzyl, naphthyl, naphthyl-$CH_2$—, or naphthyl-$OCH_2CH_2$—, wherein the phenyl or naphthyl portion of $Ar^2$ are unsubstituted or substituted with from 1 to 3 $C_1$-$C_6$ alkyl groups; each $R^1$ is independently H or $C_1$-$C_6$-alkyl; m is from 1 to 20; and n is from 1 to 100. The compound of the present invention is useful as an open time additive in waterborne coatings compositions, particularly waterborne paint compositions.

DETAILED DESCRIPTION OF THE INVENTION

The present invention is a compound having the following structure I:

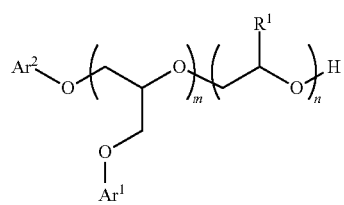

where $Ar^1$ is unsubstituted phenyl or naphthyl, or phenyl or naphthyl substituted with from 1 to 3 $C_1$-$C_6$ alkyl groups; and $Ar^2$ is phenyl, phenyl-$OCH_2CH_2$—, benzyl, naphthyl, naphthyl-$CH_2$—, or naphthyl-$OCH_2CH_2$—, wherein the phenyl or naphthyl portion of $Ar^2$ are unsubstituted or substituted with from 1 to 3 $C_1$-$C_6$ alkyl groups; each $R^1$ is independently H or $C_1$-$C_6$-alkyl; m is from 1 to 20; and n is from 1 to 100.

Examples of subclasses of compounds of the present invention are represented by the following structures:

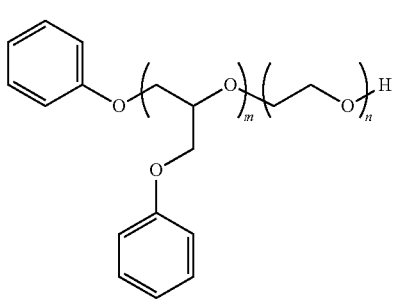

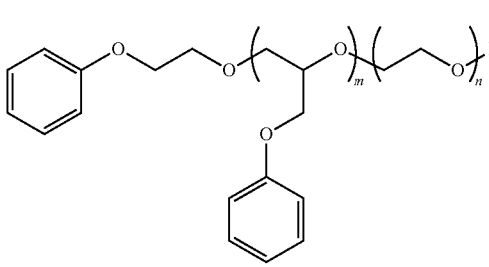

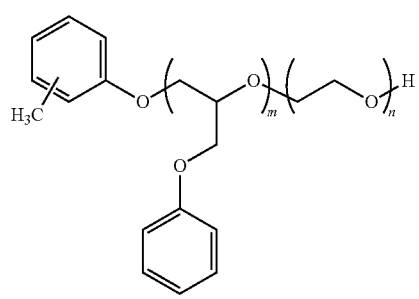

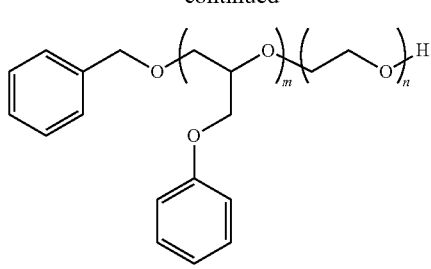

Preferably, m is in the range of from 1, more preferably from 2, to 10, more preferably to 6; and n is in the range from 5 to 40. Because each $R^1$ is independently H or $C_1$-$C_6$-alkyl, the alkylene oxide groups $((OCH_2CHR^1)_n)$ can be random or block copolymers. Preferably, each $R^1$ is independently H, methyl, or ethyl; more preferably H or methyl; most preferably each $R^1$ is H.

The compound of the present invention can be conveniently prepared by first contacting an aryl alcohol, with an aryl glycidyl ether in the presence of a catalytic amount of a suitable base such as KOH, under conditions sufficient to prepare an aryl glycidyl ether oligomer intermediate, then contacting the intermediate with an alkylene oxide such as ethylene oxide under conditions sufficient to form the desired compound I. Preferably, the aryl alcohol is phenol, a cresol, or phenoxyethanol, and the aryl glycidyl ether is phenyl glycidyl ether or cresyl glycidyl ether.

The number average molecular weight ($M_n$) of the compound, as determined by matrix assisted laser desorption ion mass spectrometry (MALDI-MS), is preferably in the range of from 300, more preferably from 500 g/mol, to preferably 20,000, more preferably to 15,000, more preferably to 10,000, and most preferably to 5,000 g/mol.

The compound of the present invention can be used as an open time additive for a coatings composition, which includes binder, rheology modifier, and any or all of the following materials: dispersants, pigments, defoamers, surfactants, solvents, extenders, coalescents, biocides, opaque polymers, and colorants.

EXAMPLES

Example 1—Preparation of Phenyl Glycidyl Ether Ethoxylate Block Copolymer Ia A 2-L round-bottom flask equipped with a temperature controlled heating mantle, an addition funnel, a reflux/distillation head, and overhead stirrer was charged with phenol (102.44 g, 1.09 moles), toluene (337.83 g), and KOH flakes (8.12 g, 90% pure). The solution was heated under $N_2$ to distil off a portion of the toluene (110 g). Phenyl glycidyl ether (490.78 g, 3.27 moles) was then added to the resulting concentrated solution at 110° C. to 120° C. over 4 h. The mixture was stirred for an additional 2 h and the flask was cooled. A portion of the resultant solution (302.3 g, 227.9 g of alkoxylate intermediate) was charged into a conical bottom 2-L Parr reactor. The reactor was sealed, pressure checked, purged with $N_2$, then heated to 120° C. Ethylene oxide (363.2 g) was added at a rate of 1-2 g/min. The mixture was held at 120° C. for 1 h, then cooled to 60° C. before unloading the product (652.7 g). The product was treated with MagSil (34.8 g) and water (8.9 g), and filtered; solvent was removed in vacuo to produce Ia (n=3, m=20; 523.3 g).

Example 2—Preparation of Phenyl Glycidyl Ether Ethoxylate Block Copolymer Ib A 250-mL round-bottom flask equipped with a temperature controlled heating mantle, an addition funnel, a reflux/distillation head, and overhead stirrer was charged with phenoxyethanol (62.26 g 0.45 mole) and KOH flakes (1.01 g, 90% pure). The solution was heated to 120° C. under $N_2$ for 2 h. Phenyl glycidyl ether (203.8 g, 1.36 moles) was added to resulting solution at 120° C. to 125° C. over 2.5 h. The mixture was stirred overnight at 120° C., then cooled. A portion of this intermediate (240.32 g) was charged into a conical bottom 2-L Parr reactor. The reactor was sealed, pressure checked, purged with $N_2$, then heated to 120° C. Ethylene oxide (357.6 g) was added at a rate of 1 to 2 g/min. The mixture was held at 120° C. overnight, then cooled to 80° C. before unloading the product (598.4 g). The reaction product was mixed with acetic acid (0.28 g) to produce Ib (m=3, n=20).

Example 3—Preparation of Phenyl Glycidyl Ether Ethoxylate Block Copolymer Ic A 250-mL round-bottom flask equipped with a temperature controlled heating mantle, an addition funnel, a reflux/distillation head, and overhead stirrer was charged with m-cresol (48.5 g, 0.45 mole) and KOH flakes (1.34 g, 90% active). The solution was heated to 120° C. under $N_2$ for 2.5 h. Phenyl glycidyl ether (203.17 g, 1.35 moles) was added to the solution at 120° C. to 130° C. over 3 h. The mixture was stirred overnight at 120° C., then cooled. A portion of this intermediate (236.77 g) was charged into a conical bottom 2-L Parr reactor. The reactor was sealed, pressure checked, purged with $N_2$, then heated to 120° C. Ethylene oxide (368.9 g) was added at a rate of 1-2 g/min. The mixture was held at 120° C. overnight, then cooled to 80° C. before unloading the product (591.38 g). The reaction product was mixed with acetic acid (0.44 g) to produce Ic (m=3, n=20).

Example 4—Preparation of Phenyl Glycidyl Ether Ethoxylate Block Copolymer Id A 250-mL round-bottom flask equipped with a temperature controlled heating mantle, an addition funnel, a reflux/distillation head, and overhead stirrer was charged with benzyl alcohol (44.60 g, 0.41 mole) and KOH flakes (2.35 g, 90% pure). The solution was heated to 120° C. under $N_2$ for 1 h. Phenyl glycidyl ether (188.64 g, 1.26 moles) was added to the solution at 120° C. to 130° C. over 2 h. The mixture was stirred overnight at 120° C., then cooled. A portion of this intermediate (209.06 g) was charged into a conical bottom 2-L Parr reactor. The reactor was sealed, pressure checked, purged with $N_2$, then heated to 120° C. Ethylene oxide (322.7 g) was added at a rate of 2 to 3 g/min. The mixture was held at 120° C. overnight, then cooled to 80° C. before unloading the product (519.56 g). The reaction product was mixed with acetic acid (0.73 g) to produce Id (m=3, n=20).

Example 5—Preparation of Phenyl Glycidyl Ether Ethoxylate Block Copolymer Ia A 2-L round-bottom flask equipped with a temperature controlled heating mantle, an addition funnel, a reflux/distillation head, and overhead stirrer was charged with phenol (62.94 g, 0.67 mole), toluene (341.34 g), and KOH flakes (4.75 g, 90% pure). The solution was heated under $N_2$ to distil off a portion of the toluene (82.81 g). Phenyl glycidyl ether (502.18 g, 3.34 moles) was then added to the resulting concentrated solution at 110° C. to 120° C. over 4 h, and the mixture was stirred for an addition 2 h. A portion of the resultant solution (374.9 g) was charged into a conical bottom 2-L Parr reactor. The reactor was sealed, pressure checked, purged with $N_2$, then heated to 120° C. Ethylene oxide (289.3 g) was added at a rate of 1 to 2 g/min. The mixture was held at 120° C. for 1 h, then cooled to 60° C. before unloading the product (650.6 g). The reaction product was treated with acetic acid (1.07 g), and solvent was removed in vacuo to produce Ia (m=5, n=20; 541.6 g).

The compounds prepared in the above examples were dissolved in water at 40 weight % solids prior to testing in paint. Paint formulations with and without the exemplified open time additives were prepared in accordance with the recipe shown in Table 1. The concentration of open time additives in the formulation was 1 weight percent, based on the weight of the formulation.

TABLE 1

Paint Formulation with Open Time Additive

| Material Name | Pounds | Gallons |
| --- | --- | --- |
| RHOPLEX ™ HG-706 Binder | 584.1 | 66.0 |
| BYK-024 Defoamer | 1.0 | 0.1 |
| Propylene Glycol | 4.3 | 0.5 |
| TRITON ™ X-100 Surfactant | 4.4 | 0.5 |
| Water | 16.7 | 2.0 |
| KATHON ™ LX 1.5% Biocide | 1.5 | 0.2 |
| TAMOL ™ 2002 Dispersant | 2.0 | 0.2 |
| Ammonia (28%) | 1.0 | 0.1 |
| Ti-Pure R-746 $TiO_2$ | 285.0 | 14.7 |
| Water | 20.0 | 2.4 |
| Texanol Coalescent | 7.9 | 1.0 |
| ACRYSOL ™ RM-2020E Rheology Modifier | 20.0 | 2.3 |
| ACRYSOL ™ RM-725 Rheology Modifier | 3.0 | 0.4 |
| BYK-024 Defoamer | 2.0 | 0.2 |
| Open Time Additive (40% aq.) | 25.8 | 2.84 |
| Water | 79 | 9.5 |
| Totals | 1030 | 100 |

RHOPLEX, TRITON, KATHON, TAMOL, and ACRYSOL are all Trademarks of The Dow Chemical Company or its Affiliates.

$M_n$ Measurement of Additive by MALDI-MS

MALDI mass spectra were acquired on a Bruker Daltonics ultraflex MALDI-TOF mass spectrometer equipped with a nitrogen laser (λ=337 nm). In the MALDI experiment, 20 mg of 2,5-dihydroxybenzoic acid was dissolved in 1 mL of THF as the MALDI matrix. The sample solution in MeOH was premixed with the matrix solution at a ratio of 1:20. To facilitate ionization of the species in the sample mixture, NaI was added into the sample/matrix mixture. A 0.3 µl sample of the mixture was then placed on the sample plate and was air dried for MALDI-MS analysis. Reflectron mode was selected in the analysis to enhance the resolution of the mass spectra.

Table 2 shows the impact on open time when using the additives of the present invention.

TABLE 2

Open Time Data

| Ex. No. | Additive | $M_n$ MALDI-MS (g/mole) | Open Time (min) |
| --- | --- | --- | --- |
| Example 1 | Phenol $(PGE)_3(EO)_{20}$ | 1470 | 12.5 |
| Example 2 | Phenoxyethanol $(PGE)_3(EO)_{20}$ | 1514 | 12.5 |
| Example 3 | m-cresol $(PGE)_3(EO)_{20}$ | 1428 | 13.0 |
| Example 4 | Benzyl Alcohol $(PGE)_3(EO)_{20}$ | 1478 | 12.5 |
| Example 5 | Phenol $(PGE)_5(EO)_{20}$ | 1840 | 11.0 |
| Comp. 1 | none | NA | 6.0 |

The invention claimed is:

1. A compound having the following structure I:

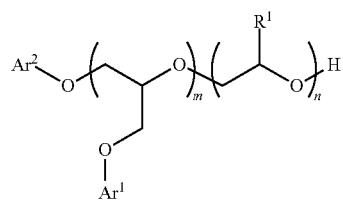

I where $Ar^1$ is unsubstituted phenyl or naphthyl, or phenyl or naphthyl substituted with from 1 to 3 $C_1$-$C_6$ alkyl groups; and $Ar^2$ is phenyl, phenyl-$OCH_2CH_2$—, naphthyl, naphthyl-$CH_2$—, or naphthyl-$OCH_2CH_2$—, wherein the phenyl or naphthyl portion of $Ar^2$ are unsubstituted or substituted with from 1 to 3 $C_1$-$C_6$ alkyl groups; each $R^1$ is independently H or $C_1$-$C_6$-alkyl; m is from 1 to 20; and n is from 2 to 100.

2. The compound of claim 1 wherein $Ar^1$ is phenyl or o-methylphenyl; $Ar^2$ is phenyl, phenyl-$OCH_2CH_2$—, or o-methylphenyl; and each $R^1$ is independently H or $CH_3$.

3. The compound of claim 2 which has a number average molecular weight in the range of from 300 to 20,000 g/mol.

4. The compound of claim 3 which has a number average molecular weight in the range of from 500 to 10,000 g/mol is selected from the group consisting of:

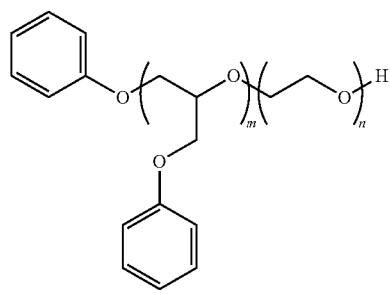

Ia

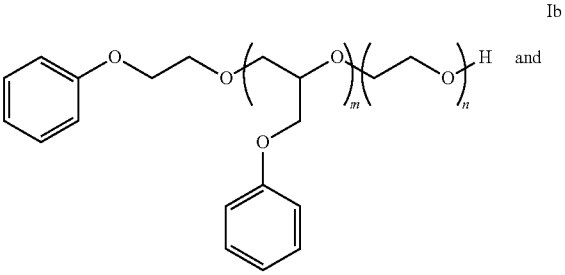

Ib and

-continued

Ic

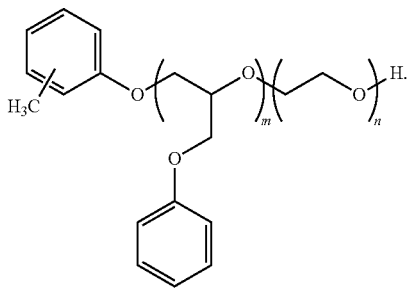

5. A coating composition comprising the compound of claim 1, a binder, a rheology modifier and at least one material selected from the group consisting of dispersants, pigments, defoamers, surfactants, solvents, extenders, coalescents, biocides, opaque polymers, and colorants.

6. A compound having the following structure:

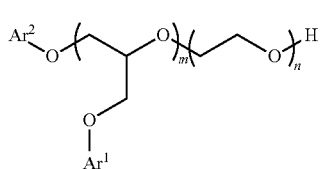

where $Ar^1$ is phenyl or phenyl substituted with from 1 to 3 $C_1$-$C_6$ alkyl groups; and with $Ar^2$ is phenyl-$OCH_2CH_2$— and where the phenyl portion of $Ar^2$ is unsubstituted or substituted with from 1 to 3 $C_1$-$C_6$ alkyl groups, where m is from 1 to 20; and n is from 1 to 100.

7. The compound of claim 6 which is represented by the following formula Ib:

Ib

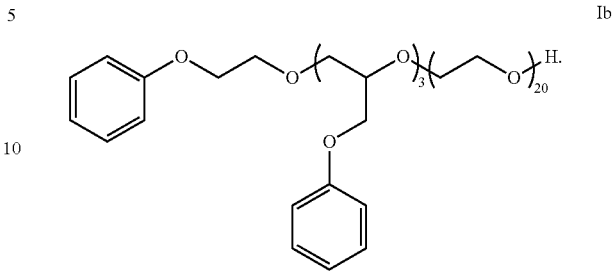

8. The compound of claim 6 which is represented by the following formula Ib:

Ib

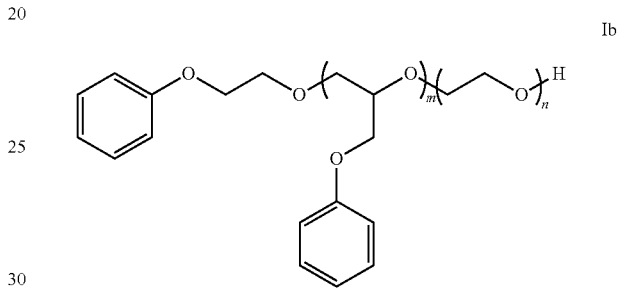

wherein the compound has a number average molecular weight in the range of from 500 to 10,000 g/mol.

* * * * *